(12) United States Patent
Kusama

(10) Patent No.: US 6,356,840 B2
(45) Date of Patent: *Mar. 12, 2002

(54) NAVIGATION DEVICE WITH A THREE DIMENSIONAL DISPLAY

(75) Inventor: Toshiki Kusama, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,235
(22) PCT Filed: Jun. 12, 1998
(86) PCT No.: PCT/JP98/02605
   § 371 Date: Oct. 1, 1999
   § 102(e) Date: Oct. 1, 1999
(87) PCT Pub. No.: WO99/64821
   PCT Pub. Date: Dec. 16, 1999
(51) Int. Cl.[7] .............................. G01C 21/00
(52) U.S. Cl. ....................... 701/211; 340/995
(58) Field of Search ............... 701/208, 211; 340/995

(56) References Cited

U.S. PATENT DOCUMENTS

| | | | | |
|---|---|---|---|---|
| 5,323,321 A | * | 6/1994 | Smith, Jr. .................. | 701/211 |
| 5,430,655 A | * | 7/1995 | Adachi ...................... | 701/209 |
| 5,613,055 A | * | 3/1997 | Shimoura et al. ........... | 345/473 |
| 5,874,905 A | * | 2/1999 | Nanba et al. ............... | 340/995 |
| 5,893,045 A | | 4/1999 | Kusama et al. ............. | 701/211 |

FOREIGN PATENT DOCUMENTS

| | | |
|---|---|---|
| JP | A62-93617 | 4/1987 |
| JP | U64-38510 | 3/1989 |
| JP | A6-139497 | 5/1994 |
| JP | A9-171348 | 6/1997 |
| JP | A9-189560 | 7/1997 |

\* cited by examiner

Primary Examiner—Michael J. Zanelli (57) ABSTRACT

The present invention is adapted to a navigation device which performs 3 dimensional display when approaching an intersection. The navigation device of the present invention comprises a map database which stores a number of vehicle lanes of a road which enters an intersection, a road width display database which decreases each vehicle lane width and increases the width of the total road depending on a number of vehicle lanes on a road, a road width display data extraction portion which extracts a number of vehicle lanes of a road which enters a corresponding intersection from a map database when approaching an intersection and which extracts road width display data corresponding to an extracted number of vehicle lanes from that road with display database a display which carries out display based on said extracted road width display data. In this way, it is easy to directly understand the number of vehicle lanes and such a display is easy to view.

14 Claims, 9 Drawing Sheets

| VEHICLE LANE NUMBER | W | L |
|---|---|---|
| 1 | 70 | 70 |
| 2 | 50 | 100 |
| 3 | 40 | 120 |
| ⋮ | ⋮ | ⋮ |

(a) ONE VEHICLE LANE (b) TWO VEHICLE LANE (c) THREE VEHICLE LANE

NAVIGATION DEVICE WITH A THREE DIMENSIONAL DISPLAY

This application is the national phase under 35 U.S.C. §371 of PCT International Application No. PCT/JP98/02605 which has an International filing date of Jun. 12, 1998, which designated the United States of America.

FIELD OF THE INVENTION

The present invention relates to a navigation device which performs three dimensional display.

BACKGROUND TO THE INVENTION

Figure 18:
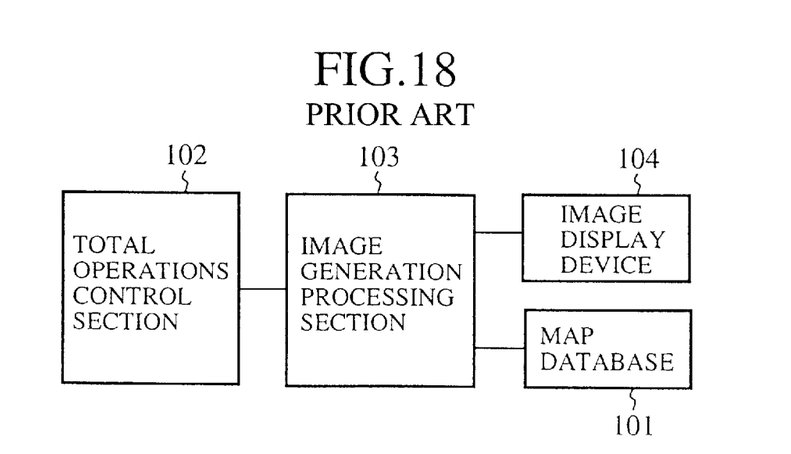
FIG. 18 is a block diagram which shows the arrangement of a conventional navigation device.

FIG. 18 is a block diagram showing a conventional navigation device. 101 is a map data base which is provided with polygon data for the three dimensional display of roads, buildings and the like. Furthermore 102 is an overall operation control section which controls the operation of the overall device. 103 is an image generation processing section which generates images and the like for three dimensional display. 104 is an image display device.

Next the operation of the invention will be explained.

The image generation processing section 103 calculates a map display range based on display perspective selection data and automobile position data supplied from the overall operational control section 102. The image generation processing section 103 reads road data and building polygon data which form the basis of the image, converts to a point coordinate system and perspective projection and generates an image for display. A three dimensional map of a fixed geographical point is displayed on the image display device 104 by the selection of a display perspective.

Since the conventional navigation device is constructed in such a way, it has been a problem that intersections are merely displayed in three dimensional format without any information with respect to such things as lanes on the road or the like.

In order to solve the above problem, it is a purpose of the present invention to provide a navigation device which can display vehicle lane information in a clear way when performing three dimensional display when approaching an intersection.

DISCLOSURE OF THE INVENTION

The navigation device of the present invention relates to a navigation device which performs three dimensional display when approaching an intersection. The navigation device is provided with a map data base which stores the number of road vehicle lanes on a road which enters an intersection, a road width display data base which stores road width display data so that each road vehicle lane width decreases depending on the number of road vehicle lanes and the overall road width increases, a road width display data extraction means which, when approaching an intersection, extracts a number of vehicle lanes which enter the corresponding intersection from the map data base and which extracts road width display data corresponding to the number of vehicle lanes from the road width display data base and a display means which displays based on the extracted road width display data.

By this arrangement, the number of vehicle lanes can be easily understood and the display is easy to view.

The vehicle navigation device of the present invention relates to a navigation device which performs three dimensional display when approaching an intersection. The navigation device is provided with a map data base which stores categories of data which discriminate lanes into those which continue straight ahead(hereafter straight lanes), left-hand lanes, right-hand lanes and branching lanes, a sign designation means which extracts a corresponding category of data from the map data base when approaching an intersection and which designates a sign corresponding to the category of data with respect to the vehicle lane based on the extracted category of data.

By this arrangement, it is easy to view lane information on the subject intersection.

The vehicle navigation device of the present invention relates to a navigation device which performs three dimensional display when approaching an intersection. The navigation device is provided at least with a map data base which stores vehicle lane information of roads entering each intersection, a vehicle lane information extraction means which extracts vehicle lane information of roads which enter the corresponding intersection from the map data base and a display means which displays only vehicle lane information of entering roads, extracted by the vehicle lane information extraction means, as vehicle lane information.

Due to the arrangement above, the necessary vehicle lane information is extremely easy to view.

The vehicle navigation device of the present invention relates to a navigation device which performs three dimensional display when approaching an intersection. The navigation device is provided with a map data base which stores destination names of roads which exit each intersection and lane information on roads which enter each intersection, a lane information storage determination means which determines whether or not lane information is stored in the map data base, an extraction means which extracts corresponding lane information from the map data base when it has been determined that such lane information is stored and which extracts a corresponding destination name from the map data base when it is determined that no lane information is stored, and a display means which displays said lane information when lane information is extracted and which displays said destination name when it is determined that a destination name has been extracted.

By such an arrangement, it is extremely easy to view lane information.

The vehicle navigation device of the present invention relates to a navigation device which performs three dimensional display when approaching an intersection. The navigation device is provided with a map data base which stores the name of each intersection, an intersection name extraction means which extracts an intersection name for the subject intersection and the names of sub-intersections in the vicinity of the subject intersection from the map data base when approaching a subject intersection which should be indicated, and a display means which respectively discriminates and displays an intersection name for the subject intersection and the names of sub-intersections extracted by the intersection name extraction means.

In this way, it is easy to discriminate the names of intersections and sub-intersections at the subject intersection.

The vehicle navigation device of the present invention relates to a navigation device which performs three dimensional display when approaching an intersection. The navigation device is provided with a map data base which stores vehicle lane information on roads which enter each intersection, a vehicle lane information extraction means which extracts vehicle lane information of the subject intersection when a subject intersection is approached which should be indicated, and a display means which displays the vehicle lane information of the extracted subject intersection point after a sub-intersection point before the subject intersection.

By the arrangement above, it is possible to change lanes with appropriate timing.

DETAILED DESCRIPTION OF THE PREFERRED EMBODIMENTS

The preferred embodiments of the present invention will be explained in detail below with reference to the accompanying figures.

Embodiment 1

Figure 1:
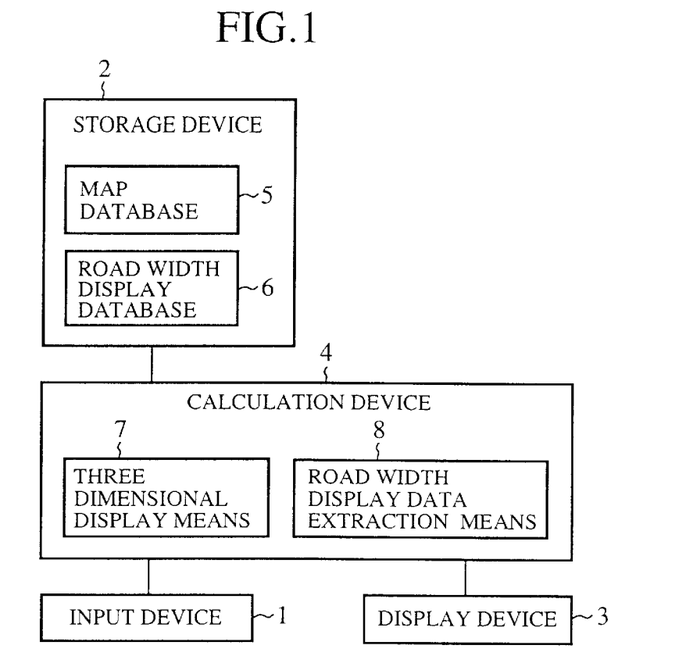
FIG. 1 is a block diagram showing the arrangement of a navigation device according to a first embodiment of the present invention.

FIG. 1 is a block diagram showing the arrangement of a navigation device according to a first embodiment of the present invention. In FIG. 1, reference numeral 1 denotes an input device such as a keyboard or a pointing device which inputs a destination. 2 is a storage device using a CD-ROM or a DVD-ROM of the like which stores necessary information for searching and guiding the route, for example a map data base. 3 is a display device such as a crystal panel or a CRT which displays the guidance of the route and functions as a display means. 4 is a calculation device which controls the above devices and executes search and guidance processing of the route.

The memory device 2 is provided with a road width display database 6 and a map data base 5.

Figure 2:
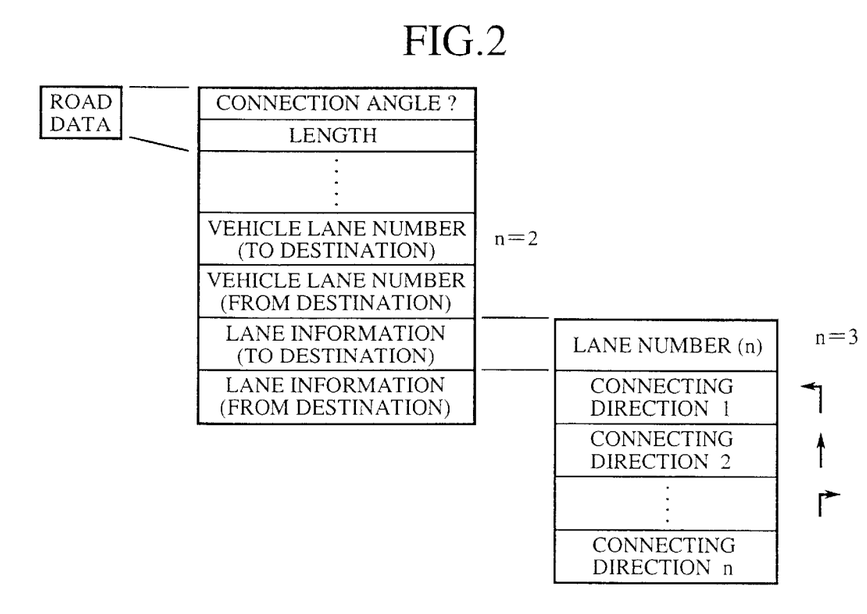
FIG. 2 shows an example of road data which is stored in a map data base according to a first embodiment of the present invention.
Figure 3:
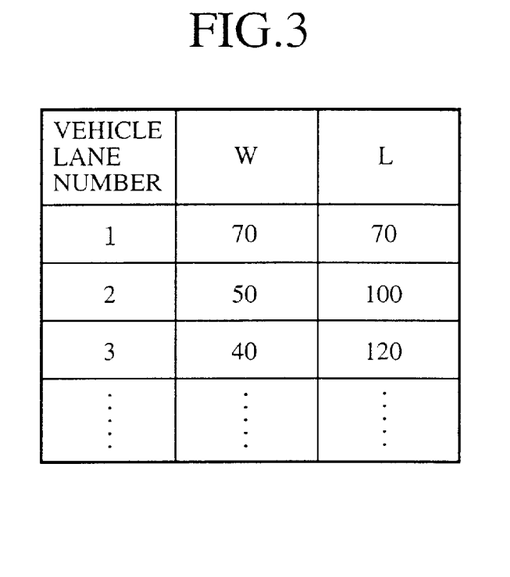
FIG. 3 shows an example of road width display data which is stored in a road width display data base according to a first embodiment of the present invention.

The map data base 5 stores necessary map data for searching and guiding the route and stores the number of vehicle lanes and the like which enter the intersection. FIG. 2 shows an example of road data which is stored in a map data base 5. As shown in FIG. 2, road data includes the connection angle, length, the number of lanes both to and away from-the destination and lane information both to and away from the destination. Here a "vehicle lane" is a vehicle lane of a length of a geographical point (for example the length of an intersection). A "lane" is a vehicle lane when it enters an intersection. For example, when a road with two "vehicle lanes" enters an intersection, there are three "lanes" in the case that a new right hand lane is added. Lane information includes the number of lanes, the direction of flow of each lane (categories of data which are divided into straight lanes, right-hand lanes, left-hand lanes, branching lanes). The road width display database 6, as shown in FIG. 3, stores a road width display database which decreases each road lane width W depending on the number of road lanes on the road (1, 2, 3 . . . ) (W1>W2>W3>. . . ) and increases the width L of the entire road (L1<L2<L3<. . . ).

The calculation device 4 is provided with a 3 dimensional display means 7 and a road width display data extraction means 8.

The 3 dimensional display means 7 performs a 3 dimensional display when the automobile is nearing an intersection by the suitable control of the interval of the automobile and the view point, the angle of the viewpoint and the height of the view point in order to perform 3 dimensional display. The road width display data extraction means 8 extracts the number of vehicle lanes on the road which enter the intersection in question from the map database 5 when the vehicle is nearing an intersection and which extracts, from the road width display database 6, road width display data which corresponds to the number of extracted vehicle lanes.

Figure 4:
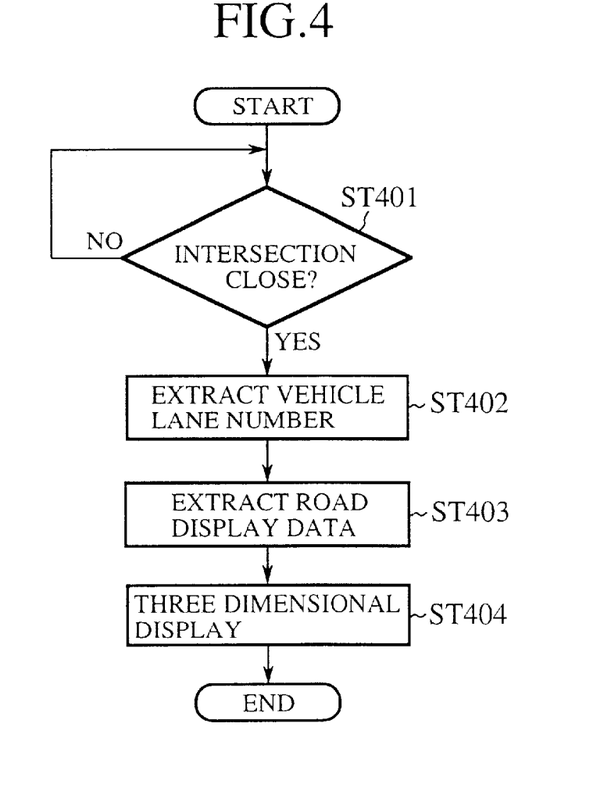
FIG. 4 is a flowchart showing the operation of a navigation device according to a first embodiment of the present invention.

Next the operation of the invention will be explained. FIG. 4 is a flowchart which shows the operation of a first embodiment of the invention.

Figure 5:
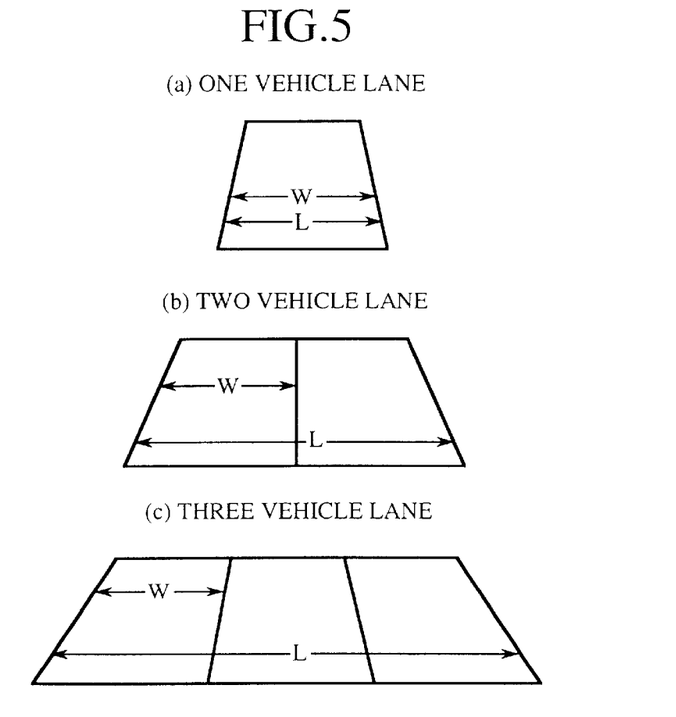
FIG. 5 is an example of a display according to a first embodiment of the present invention.

In the calculation device 4, when the vehicle approaches (for example travels to within 500M ) of an intersection (step ST401), the road width display data extraction means 8 first extracts a number of vehicle lanes on the road which enter the intersection in question from the map database 5 (step ST402) when the vehicle approaches the intersection (step ST401) and then extracts road width display data which corresponds to the number of extracted vehicle lanes from the road width display database 6 (step ST403). The 3 dimensional display means 7 carries 3 dimensional display based on such road width display data (step ST404). Therefore as shown in FIGS. 5(a)–(c), for example although the total width of the road is increased in the case of 2 or 3 vehicle lanes as opposed to one vehicle lane, the width does not increase proportional to the number of vehicle lanes.

As shown above, according to the first embodiment of the invention, since a width of a vehicle lane display of a road is stored depending on a preset number of vehicle lanes, it is possible to carry out a suitable display depending on the size of the screen irrespective of the number of vehicle lanes. Furthermore although the total road width increases with increases in the number of road lanes, since the increases are not proportional to the number of vehicle lanes, it is possible to directly and easily understand the number of vehicle lanes and create an easily viewed display.

Embodiment 2

Figure 6:
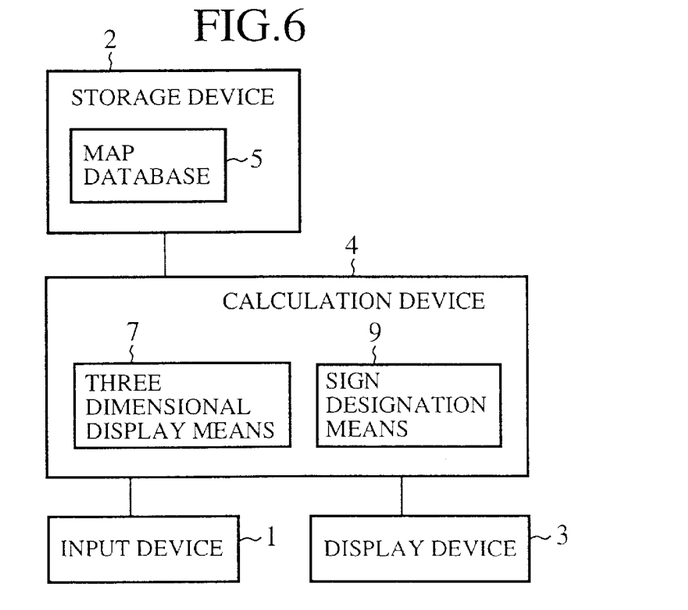
FIG. 6 is a block diagram which shows the arrangement of a navigation device according to a second embodiment of the present invention.

FIG. 6 is a block diagram of a navigation device according to a second embodiment of the present invention. Similar components are designated by similar reference numerals as in FIG. 1 and will not be explained again. The calculation device 4 of this navigation device is provided with a sign designation means 9 which extracts a corresponding category of data from the map data base 5 when the vehicle approaches an intersection and which designates a sign corresponding to a category of data with respect to each vehicle lane based on the extracted category of data.

The operation of the invention will be explained next.

Figure 7:
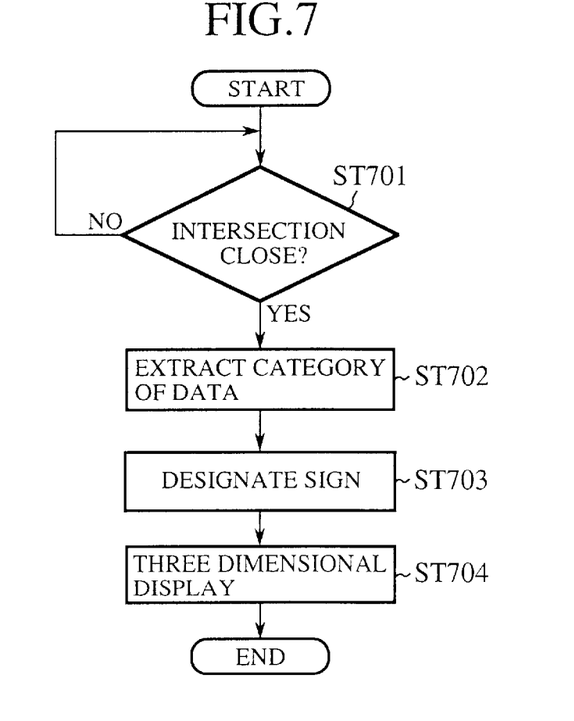
FIG. 7 is a flowchart which shows the operation of a navigation device according to a second embodiment of the present invention.
Figure 8:
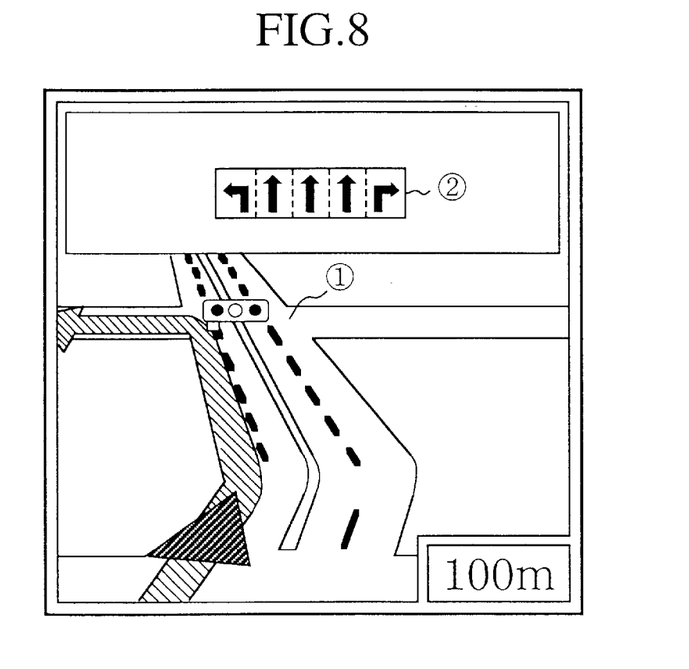
FIG. 8 shows an example of a display according to a second embodiment of the present invention.

In the calculation device 4, when the vehicle approaches an intersection (step ST701), first the sign designation means 9 extracts a corresponding category of data from the map database 5 (step ST702) and a sign is designated to the category of data with respect to each vehicle lane based on the extracted category of data (step ST703). Thus 3 dimensional display is performed including the sign designated by the sign designation means 9 (step ST704). A display example is shown in FIG. 8. In FIG. 8, 1̂ is a subject intersection point which is displayed in 3 dimensions, 2̂ is a sign (a sign which discriminates a straight lane, a right-hand lane, a left-hand lane, a branching lane (here they are discriminated by the direction of the arrow)). At this time it is possible for the driver to accurately recognize the position of the lane which the vehicle should take (for example the lane on the far right side or the like) by highlighted display such as blinking or reverse display of the lane that the vehicle should take based on information about the guided route.

As above, according to embodiment 2 of the present invention, since the sign of the lane which shows the category of each lane (discriminates a straight lane, a right hand lane, a left hand lane, a branching lane) is displayed in the vicinity of a subject intersection when the entering a subject intersection, lane selection when entering the subject intersection is facilitated. Furthermore lane information is displayed in an easily understood form.

Embodiment 3

Figure 9:
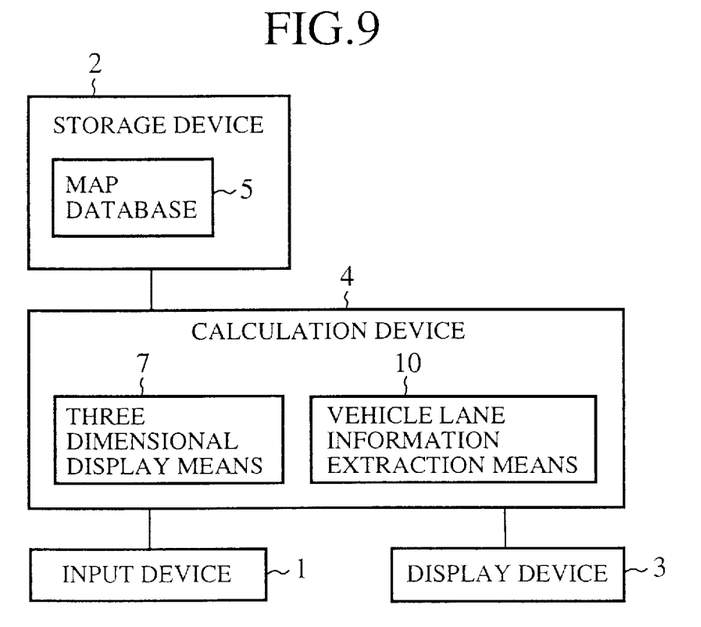
FIG. 9 is a block diagram showing a navigation device according to a third embodiment of the present invention.

FIG. 9 is a block diagram showing the layout of a navigation device according to a third embodiment of the present invention. Similar components are designated by similar reference numerals as in FIG. 1 and will not be explained again. In the navigation device, the calculation device 4 is provided with a vehicle lane information extraction means 10 which extracts vehicle lane information about a road which enters an intersection in question from the map database 5 when approaching an intersection.

The operation of the invention will be now explained.

Figure 10:
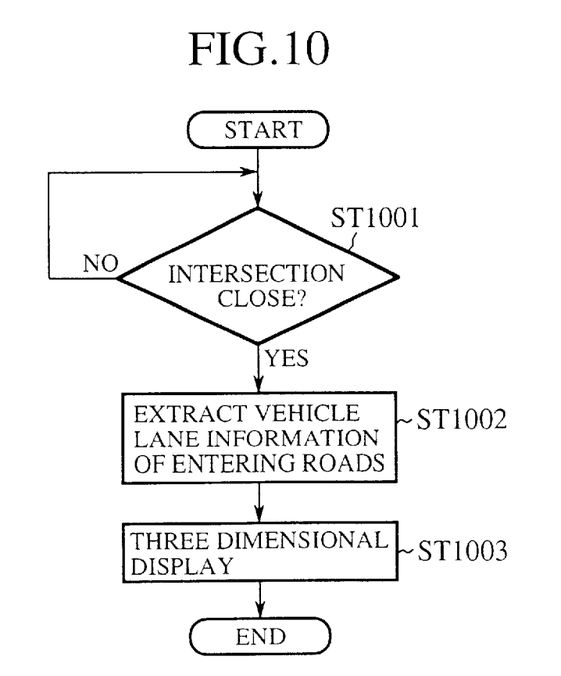
FIG. 10 is a flowchart which shows the operation of a navigation device according to a third embodiment of the present invention.

FIG. 10 is a flowchart which shows the operation of a third embodiment of the present invention.

The calculation device 4 firstly extracts vehicle lane information about a road which enters an intersection in question from the map database 9 (step ST1002) when approaching an intersection (step ST1001). Then 3 dimensional display is carried out which includes the vehicle lane information extracted by the vehicle lane information extraction means 10 (step ST1003). Other roads are displayed for example as fixed or simplified single vehicle lane displays. FIG. 8 shows display examples of a third embodiment of the present invention. In other words, vehicle lane information relating to roads entering an intersection in question is displayed, however other vehicle lane information such as vehicle lane information about opposite vehicle lanes, the flow of vehicle lanes, sub-intersection road intersections and the like are not displayed.

As shown above, according to the third embodiment of the present invention, since only information relating to vehicle lanes of roads which enter an intersection in question is displayed, an extremely clear display of the necessary vehicle lane information is achieved.

Embodiment 4

Figure 11:
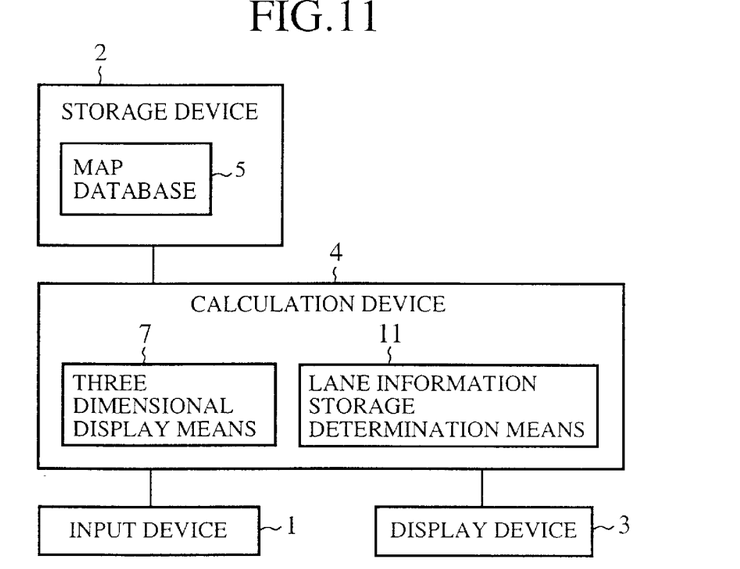
FIG. 11 is a block diagram which shows a navigation device according to a fourth embodiment of the present invention.

FIG. 11 is a block diagram which shows the layout of a navigation device according to a fourth embodiment of the present invention. Similar components are designated by similar reference numerals as in FIG. 1 and will not be explained again. In the navigation device, the map database 5 stores lane data of roads which enter each intersection and destination names of roads which exit each intersection. The calculation device 4 is provided with a lane information storage determination means 11 which determines whether or not lane information is stored in the map database 5.

The operation of the invention will now be explained.

Figure 12:
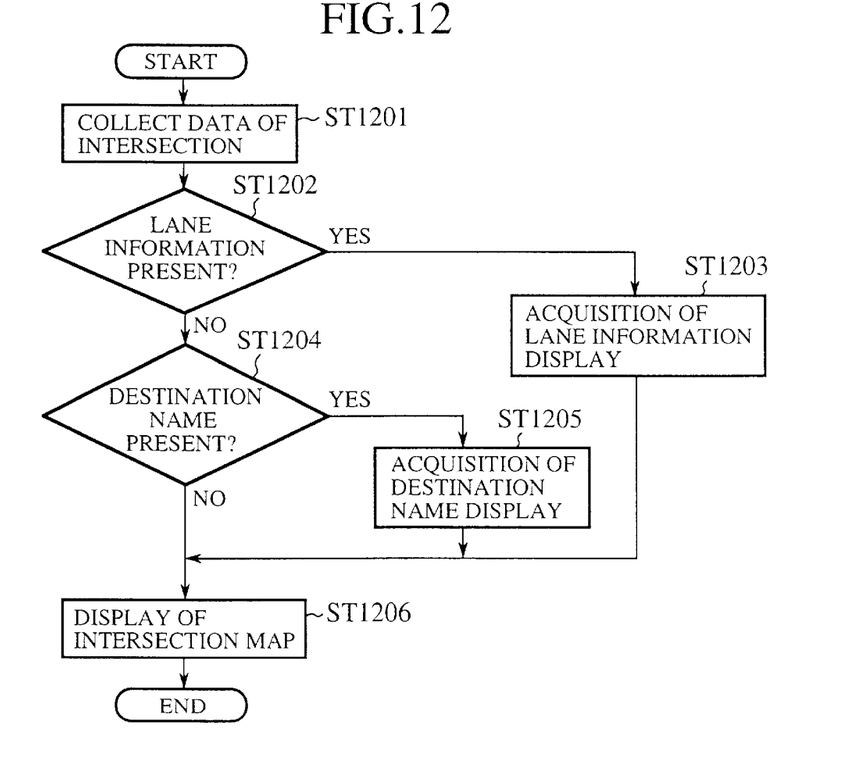
FIG. 12 is a flowchart which shows the operation of a fourth embodiment of the present invention.

FIG. 12 is a flowchart which shows the operation of a fourth embodiment of the present invention.

Figure 13:
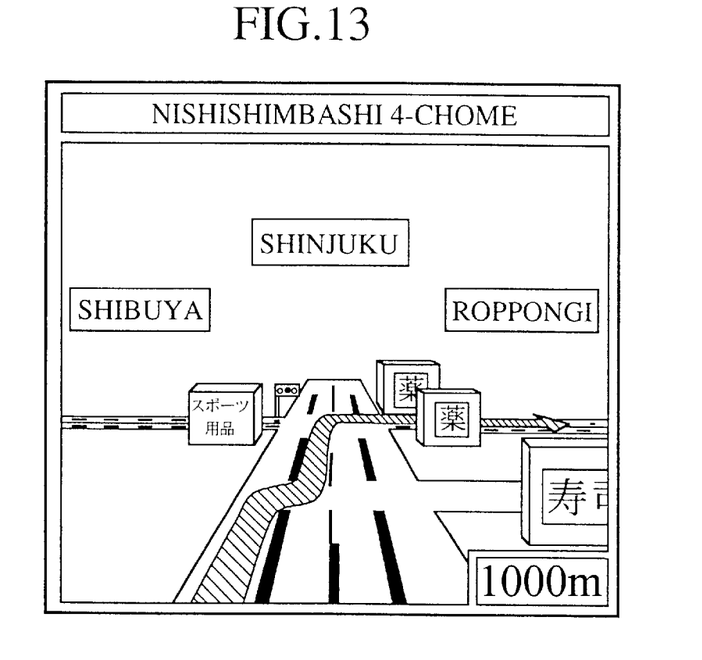
FIG. 13 shows an example of a display according to a fourth embodiment of the present invention.

The calculation device 4 collects data relating to the intersection from the map database 5 on approaching the intersection (step ST1201). The lane information storage determination means 11 determines whether or not lane information is stored in the map database 5 (step ST1202). When it is determined that lane information is stored, the related lane information is extracted from the map database 5 (step ST1203). When it is determined that lane information is not stored, it is determined whether or not a related destination name is stored in the map database 5 (step ST1204). When such information is stored, the related destination name is extracted (step ST1205). When lane information is extracted, the intersection is displayed in 3 dimensions including the related lane information and when the destination name is extracted, the intersection is displayed in 3 dimensions including the related destination name (step ST1206). For example, the 3 dimensional display of the intersection including lane information is performed as shown in FIG. 8. The 3 dimensional display of the intersection including destination names is performed as shown in FIG. 13. However the display of these two functions is not determined by the presence or absence of lane information or destination information. For example, when considerable distance remains to the intersection, the destination name is displayed, when the intersection is close, lane information is displayed. When the intersection is distant (FIG. 13 displays this as 1000 M ahead (refer to the display in the bottom right hand corner in FIG. 13)), the user can select the optimal vehicle lane in the desired direction by the destination name. When the intersection is close, (FIG. 8 displays this as 100 M ahead (refer to the display in the bottom right hand corner in FIG. 8)), the lane in the direction of turning is selected and the vehicle lane which proceeds into this lane is chosen beforehand and thus it is possible to select an appropriate lane when entering an intersection.

As shown above, according to embodiment 4, appropriate display of lane information and destination names is possible. Furthermore since destination name information is not displayed at the same time as lane information, lane information is extremely easy to view.

Embodiment 5

Figure 14:
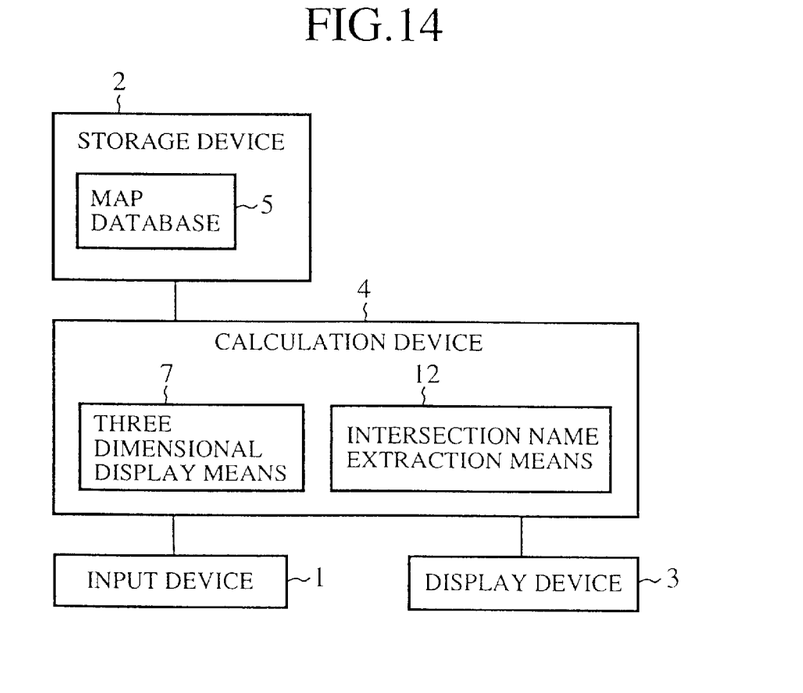
FIG. 14 is a block diagram showing the arrangement of a navigation device according to a fifth embodiment of the present invention.

FIG. 14 is a block diagram showing the layout of a navigation device according to a fifth embodiment of the present invention. Similar components are designated by similar reference numerals as in FIG. 1 and will not be explained again. In the navigation device, the map database 5 stores information relating to the intersection names of each intersection. The calculation device 4 is provided with an intersection name extraction means 12 which extracts the intersection names of the subject intersection and the intersection names of sub-intersections in the proximity of the subject intersection from the map database.

The operation of the embodiment will now be explained.

Figure 15:
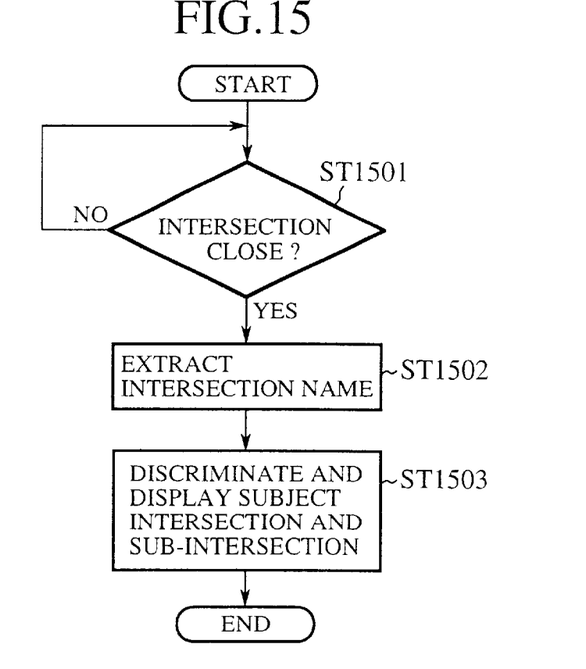
FIG. 15 is a flowchart which shows the operation of a fifth embodiment of the present invention.

FIG. 15 is a flowchart showing the operation of the invention according to a fifth embodiment.

On approaching an intersection (step ST1501) the intersection name extraction means 12 in the calculation device 4 firstly extracts the intersection name of the subject intersection and the intersection names of sub-intersections in the proximity of the subject intersection from the map database (step ST1502). Then 3 dimensional display is performed on the basis of the respective categories of extracted intersection names of the subject intersection and intersection names of sub-intersections (step ST1503). For example, display is performed by displaying the intersection name of the subject intersection and intersection names of sub-intersections in different colors or in different sizes.

As shown above, according to embodiment 5, since the respective categories of an extracted intersection name of the subject intersection and intersection names of sub-intersections are distinguished, it is easy to distinguish an intersection name on the subject intersection from those on sub-intersections.

Embodiment 6

Figure 16:
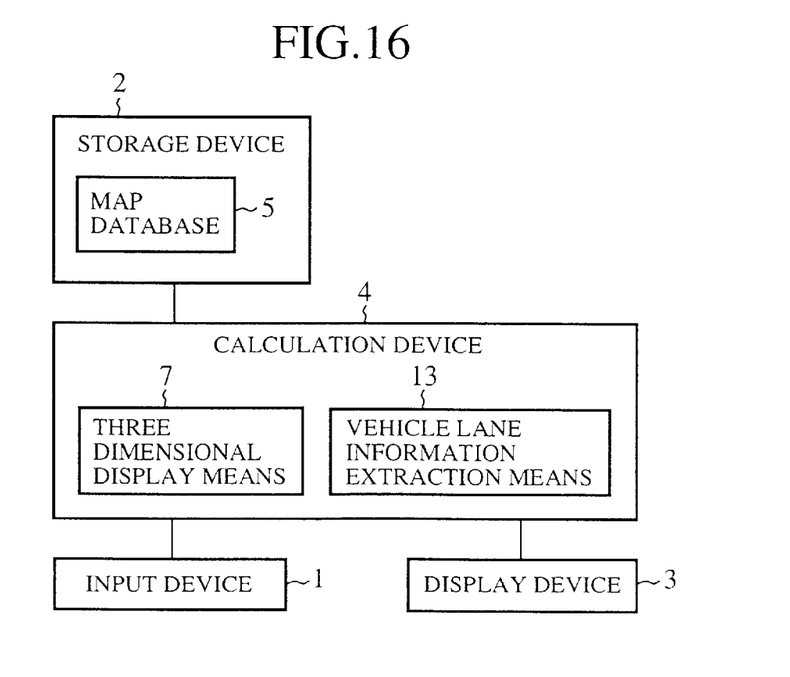
FIG. 16 is a block diagram which shows a navigation device according to a sixth embodiment of the present invention.

FIG. 16 is a block diagram showing the layout of a navigation device according to a sixth embodiment of the present invention. Similar components are designated by similar reference numerals as in FIG. 1 and will not be explained again. In the navigation device, the map database 5 stores vehicle -lane information on roads entering each intersection. The calculation device 4 is provided with a vehicle lane information extraction means 13 which extracts vehicle lane information relating to the subject intersection when approaching an intersection which should be indicated.

Next the operation of the embodiment will be explained.

Figure 17:
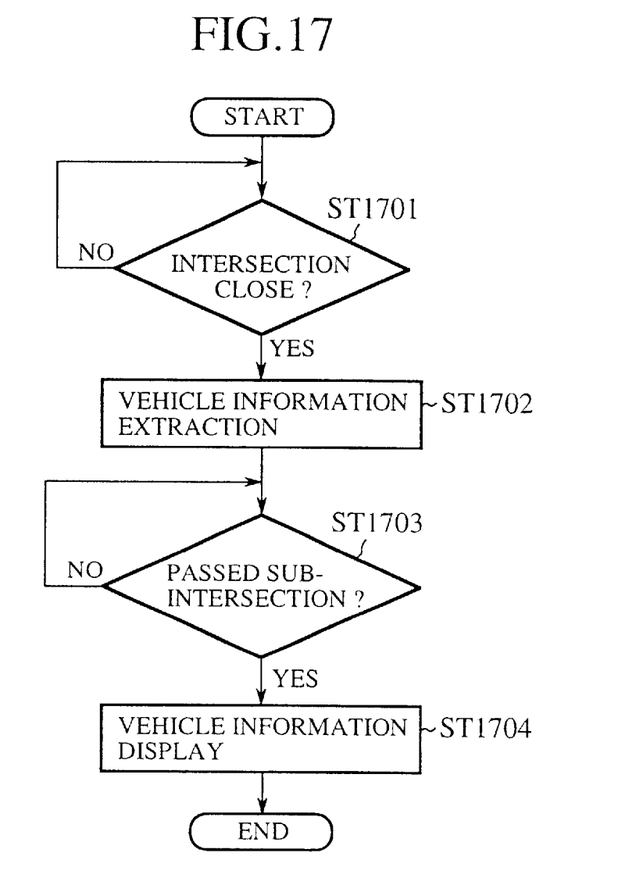
FIG. 17 is a flowchart which shows the operation of a sixth embodiment of the present invention.

In the calculation device 4, when approaching an intersection which should be indicated (step ST1701), first the vehicle lane information extraction means 13 extracts vehicle lane information about a subject intersection (step ST1702). After passing a sub-intersection before the subject intersection (step ST1703), vehicle lane information about the extracted subject intersection is displayed (step ST1704).

As shown above, according to embodiment 6, after passing a sub-intersection before the subject intersection (step ST1703), since vehicle lane information about the extracted subject intersection is displayed, it is possible to change lanes at an exact time.

Industrial Applicability

As shown above, the navigation system of the present invention displays vehicle lane information in a three dimensional intersection guiding image. The present invention also discriminates and displays subject intersections and sub-intersections as well as guiding the driver in the desired direction in a clearly understood manner.

What is claimed is:

1. A navigation device which performs 3 dimensional display when approaching an intersection which comprises
    a map database which stores a number of vehicle lanes of a road which enters said intersection,
    a road width display database which stores road width display data which reduces a width of each vehicle lane and increases the width of the total road depending on a number of vehicle lanes on said road,
    a road width display data extraction means which extracts a number of vehicle lanes on a road which enters a subject intersection from said map database when approaching said intersection and which extracts road width display data corresponding to a number of extracted vehicle lanes from said road width display database, and
    a display means which performs display based on road width display data extracted by said road width display data extraction means.

2. A navigation device according to claim 1 which further comprises
    a lane information storage determination means which determines on approaching an intersection whether or not lane information is stored in said map database, said map database storing lane information of roads which enter each intersection and designation names of roads which exit from each intersection,
    an extraction means which extracts corresponding lane information from said map database when it is determined that lane information is stored by said lane information storage determination means and which extracts a corresponding destination name from said map database when it is determined that lane information is not stored,
    wherein corresponding lane information is displayed when lane information is extracted by said extraction means and a corresponding destination name is displayed when a destination name is extracted.

3. A navigation device according to claim 1 which further comprises a intersection name extraction means which extracts, from said map database, an intersection name of a subject intersection and of a sub-intersection in the vicinity of said subject intersection when approaching an intersection which should be indicated, said map database storing intersection names of each intersection,
    wherein an intersection name of a subject intersection and of a sub-intersection in the vicinity of said subject intersection extracted by said intersection name extraction means are respectively distinguished and displayed.

4. A navigation device according to claim 1 which further comprises a vehicle lane information extraction means which extracts vehicle lane information about a subject intersection from said map database on approaching an intersection which should be guided, said map database storing vehicle lane information about roads which enter each intersection,
    wherein after passing a sub-intersection before a subject intersection, vehicle lane information about said subject intersection extracted by said vehicle lane extraction means is displayed.

5. A navigation device which performs 3 dimensional display when approaching an intersection which comprises
a map database which stores vehicle lane data about a road which enters each said intersection,
a vehicle lane information extraction means which extracts vehicle lane information about a road which enters an intersection in question from said map database on approaching said intersection and
a display means which displays only vehicle lane information about entering roads extracted by said vehicle lane information extraction means as vehicle lane information.

6. A navigation device according to claim 5 which further comprises
a lane information storage determination means which determines on approaching an intersection whether or not lane information is stored in said map database, said map database storing lane information of roads which enter each intersection and destination names of roads which exit from each intersection,
an extraction means which extracts corresponding lane information from said map database when it is determined that lane information is stored by said lane information storage determination means and which extracts a corresponding destination name from said map database when it is determined that lane information is not stored,
wherein corresponding lane information is displayed when lane information is extracted by said extraction means and a corresponding destination name is displayed when a destination name is extracted.

7. A navigation device according to claim 5 which further comprises a intersection name extraction means which extracts, from said map database, an intersection name of a subject intersection and of a sub-intersection the vicinity of said subject intersection when approaching an intersection which should be indicated, said map database storing intersection names of each intersection,
wherein an intersection name of a subject intersection and of a sub-intersection in the vicinity of said subject intersection extracted by said intersection name extraction means are respectively distinguished and displayed.

8. A navigation device according to claim 5,
wherein after passing a sub-intersection before a subject intersection, vehicle lane information about said subject intersection extracted by said vehicle lane extraction means is displayed.

9. A navigation device capable of performing three-dimensional display when approaching an intersection comprising:
a map database which stores categories of data which discriminate each vehicle lane of a road which enters said each intersection into at least a straight lane, a right hand lane, a left hand lane, and a branching lane;
a sign designation means which extracts said categories of data from said map database on approaching said intersection and which designates a sign corresponding to categories of data with respect to each vehicle lane based on extracted categories of data; and
a display means which performs display based on sign designated by said sign designation means which further comprises a intersection name extraction means which extracts, from said map database, an intersection name of a subject intersection and of a sub-intersection in the vicinity of said subject intersection when approaching an intersection which should be indicated, said map database storing intersection names of each intersection;
wherein an intersection name of a subject intersection and of a sub-intersection in the vicinity of said subject intersection extracted by said intersection name extraction means are respectively distinguished and displayed.

10. A navigation device capable of performing three-dimensional display when approaching an intersection comprising:
a map database which stores categories of data which discriminate each vehicle lane of a road which enters said each intersection into at least a straight lane, a right hand lane, a left hand lane, and a branching lane;
a sign designation means which extracts said categories of data from said map database on approaching said intersection and which designates a sign corresponding to categories of data with respect to each vehicle lane based on extracted categories of data; and
a display means which performs display based on sign designated by said sign designation means which further comprises a vehicle lane information extraction means which extracts vehicle lane information about a subject intersection from said map database on approaching an intersection which should be guided, said map database storing vehicle lane information about roads which enter each intersection;
wherein after passing a sub-intersection before a subject intersection, vehicle lane information about said subject intersection extracted by said vehicle lane extraction means is displayed.

11. A navigation device comprising:
a map database for storing a number of vehicle lanes of a road entering an intersection;
a road width database for storing road width information including a width associated with each of the number of vehicle lanes and further including a total width associated with the road depending on the number of vehicle lanes of the road;
a road width display data extraction means for extracting the stored road width information including the number of vehicle lanes when approaching the intersection; and
a display for displaying the road according to the extracted road width display data.

12. A navigation device for performing three-dimensional display when approaching an intersection, the navigation device comprising:
a map database for storing information associated with a road entering the intersection according to categories, the categories including one or more of: a straight lane, a right-hand lane, a left-hand lane, a branching lane, a number of lanes, and a road width;
a sign designation means for extracting the information when approaching the intersection and designating a sign corresponding to the categories; and
a display for displaying the designated sign.

13. A method comprising the steps of:
storing a number of vehicle lanes associated with a road entering an intersection;
storing road width information associated with the road including a width associated with each of the number of vehicle lanes and further including a total width associated with the road depending on the number of vehicle lanes associated with the road;

extracting the stored road width information including the number of vehicle lanes when approaching the intersection; and displaying the road according to the extracted road width display data.

14. A method for performing three-dimensional display when approaching an intersection, the method comprising the steps of:

storing information associated with a road entering the intersection according to categories, the categories including one or more of: a straight lane, a right-hand lane, a left-hand lane, a branching lane, a number of lanes, and a road width;

extracting the information when approaching the intersection and designating a sign corresponding to the categories; and displaying the designated sign.

* * * * *